(12) United States Patent
Nakao et al.

(10) Patent No.: US 8,155,873 B2
(45) Date of Patent: Apr. 10, 2012

(54) VEHICLE-POSITION-RECOGNITION APPARATUSES, METHODS, AND PROGRAMS

(75) Inventors: Koichi Nakao, Okazaki (JP); Masaki Nakamura, Okazaki (JP); Tomoaki Ishikawa, Osazaki (JP); Motoki Kanba, Okazaki (JP); Osamu Aisaka, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 812 days.

(21) Appl. No.: 12/213,074

(22) Filed: Jun. 13, 2008

(65) Prior Publication Data
US 2009/0005980 A1    Jan. 1, 2009

(30) Foreign Application Priority Data
Jun. 29, 2007 (JP) .................. 2007-171892

(51) Int. Cl.
*G01C 21/36* (2006.01)
(52) U.S. Cl. ......... 701/210; 370/401; 370/206; 715/711
(58) Field of Classification Search .......... 701/210, 701/201, 208, 209; 340/995.19, 934; 370/401, 370/206; 715/711; G01C 21/36
See application file for complete search history.

(56) References Cited

U.S. PATENT DOCUMENTS

| | | | |
|---|---|---|---|
| 6,662,105 B1 * | 12/2003 | Tada et al. ...................... | 701/209 |
| 6,807,483 B1 * | 10/2004 | Chao et al. ..................... | 701/210 |
| 7,403,852 B2 * | 7/2008 | Mikuriya et al. ............. | 701/208 |
| 7,493,212 B2 * | 2/2009 | Sumizawa et al. ............. | 701/208 |
| 7,711,485 B2 * | 5/2010 | Matsumoto ..................... | 701/301 |
| 7,725,254 B2 * | 5/2010 | Sumizawa et al. ............. | 701/209 |
| 7,797,103 B2 * | 9/2010 | Ishigami et al. ............. | 701/207 |
| 7,907,590 B2 * | 3/2011 | Lee et al. ....................... | 370/349 |
| 7,908,081 B2 * | 3/2011 | Sumizawa et al. ............. | 701/210 |
| 2003/0182056 A1 * | 9/2003 | Nozaki et al. ................. | 701/209 |
| 2004/0027258 A1 * | 2/2004 | Pechatnikov et al. ...... | 340/995.1 |

(Continued)

FOREIGN PATENT DOCUMENTS

| | | | |
|---|---|---|---|
| EP | 2 019 382 A1 | | 1/2009 |
| JP | 2003148982 A | * | 5/2003 |
| JP | A-2005-114535 | | 4/2005 |
| JP | A 2005-292082 | | 10/2005 |

(Continued)

OTHER PUBLICATIONS

Nov. 16, 2011 European Search Report issued in EP 08 15 8143.

*Primary Examiner* — Tuan C. To
(74) *Attorney, Agent, or Firm* — Oliff & Berridge, PLC

(57) ABSTRACT

Vehicle-position-recognition apparatuses, methods, and programs acquire current position information indicating a current position of a vehicle and acquire road information indicating at least one road based on a connection relationship between plural links. The apparatuses, methods, and programs determine a link where the vehicle travels based on the current position information and the road information and generate travel-history information indicating a route that the vehicle travels at a point where a link is branched based on the determined link. The apparatuses, methods, and programs acquire an image of an area surrounding the vehicle, recognize a recognition target in the acquired image, and store the generated travel-history information in the memory in association with information indicating the recognition of the recognition target. The apparatuses, methods, and programs generate learning-priority information indicating a priority of each link branched out at the branch point based on the stored travel-history information and the stored recognition information, the generated learning-priority information usable to determine on which of the links branched out at the branch point that the vehicle is traveling.

20 Claims, 6 Drawing Sheets

U.S. PATENT DOCUMENTS

| | | | |
|---|---|---|---|
| 2004/0056797 A1* | 3/2004 | Knockeart et al. | 342/357.13 |
| 2004/0090950 A1* | 5/2004 | Lauber et al. | 370/352 |
| 2004/0215389 A1* | 10/2004 | Hirose | 701/209 |
| 2004/0267447 A1* | 12/2004 | Takizawa | 701/209 |
| 2005/0052413 A1* | 3/2005 | Ueno | 345/158 |
| 2005/0222768 A1 | 10/2005 | Tauchi et al. | |
| 2006/0009904 A1* | 1/2006 | Sakashita et al. | 701/200 |
| 2009/0271105 A1* | 10/2009 | Kindo et al. | 701/201 |

FOREIGN PATENT DOCUMENTS

| | | | |
|---|---|---|---|
| JP | A 2006-017644 | | 1/2006 |
| JP | 2006293876 A | * | 10/2006 |
| JP | A 2006-284254 | | 10/2006 |
| JP | 2007034790 A | * | 2/2007 |
| JP | A-2007-078519 | | 3/2007 |

\* cited by examiner

VEHICLE-POSITION-RECOGNITION APPARATUSES, METHODS, AND PROGRAMS

INCORPORATION BY REFERENCE

The disclosure of Japanese Patent Application No. 2007-171892, filed on Jun. 29, 2007, including the specification, drawings, and abstract thereof, is incorporated herein by reference in its entirety.

BACKGROUND

1. Technical Fields

Related technical fields include apparatuses, methods, and programs that recognize the position of a vehicle.

2. Description of the Related Art

Technologies for displaying the position of the vehicle and providing guidance along a route to a destination by using road-map data corresponding to actual roads are known. The road-map data includes road-network data including data on a combination of nodes and links. Usually, the node data is coordinates indicating an intersection of roads, a corner, and the like. The link data is represents links connecting the nodes to each other. Consequently, a road network showing roads based on connection relationships between plural links is achieved. Each of the links is provided with link information representing the attributes thereof. The attributes denote, for example, the link number, the coordinates of each of a start-point node and an end-point node, the link length, the type of a road, the road width, traffic regulation, and the like.

The navigation apparatus acquires information about the position of the vehicle by performing satellite navigation using a global-positioning system (GPS), autonomous navigation using an on-vehicle sensor, and the like, and identifies the vehicle position on the road-map data. However, when the vehicle travels on a narrow-angle-branch road (i.e., a road that is branched out at a relatively small angle), the vehicle-position data is often misidentified as being on a road different from the narrow-angle-branch road. This misidentification can be due to an error of the satellite navigation and/or the autonomous navigation. In the navigation apparatus, the vehicle misidentified vehicle position is superimposed and displayed on the road-map data. However, when the displayed road-map data shows a position different from the actual position of the vehicle, the driver of the vehicle can become confused.

Japanese Unexamined Patent Application Publication No. 2005-292082 (see, e.g., paragraphs [0002]-[0012]), erroneous mapping caused due to the position-measurement error can be reduced through the use of a high-precision position measurement unit that is under study, so as to be introduced in the future. Further, Japanese Unexamined Patent Application Publication No. 2006-017644 (see, e.g., paragraphs [0016]-[0024]) discloses a navigation apparatus configured to determine which of branched roads the vehicle currently travels based on a threshold vehicle speed determined based on the speed limit of a branch route and/or the state of a turn signal used to make a lane change.

When data on a destination is transmitted to known navigation apparatuses, the route of the vehicle is calculated based on the destination data so that guidance to the destination can be easily provided. On the other hand, when the destination data is not transmitted, data on a virtual target area is calculated based on the travel of the vehicle and the information corresponding to a route to the virtual target area is provided. If a road contains a branch, it becomes difficult to predict the virtual target area ahead of the branch in the road. Japanese Unexamined Patent Application Publication No. 2006-284254 (see, e.g., paragraphs [0002]-[0007] and [0043]-[0059]) proposes a course-prediction method used to predict and provide a course leaving a branch based on the travel history of a driver at the branch.

SUMMARY

If the vehicle position is measured at a high precision at the narrow-angle branch, as is the case with the technology disclosed in Japanese Unexamined Patent Application Publication No. 2005-292082, the erroneous mapping can be significantly reduced. However, such a high-precision position-measurement unit and/or system is expensive and increases the cost of the navigation apparatus itself. The use of the technology disclosed in Japanese Unexamined Patent Application Publication No. 2006-017644 allows for increasing the accuracy of determining a road, that is, a link on the narrow-angle branch. However, the vehicle speed, the state of the turn signal, and the like, may be used in various combinations and at different times according to the place of the branch point, the driver's operation, and the like. Further, because vehicle information other than information used to perform the satellite navigation and/or the autonomous navigation is used, calculations performed by the navigation apparatus may become complicated.

According to the course-prediction method of Japanese Unexamined Patent Application Publication No. 2006-284254, a link can be determined based on the satellite navigation and/or the autonomous navigation without tracking a travel route ahead of the branch. Therefore, map-matching using a result of the leaving-course prediction is not performed and the need for the map-matching is not mentioned. That is, the above-described actual problem of the map-matching function of the navigation apparatus, particularly, the problem occurring at the narrow-angle branch is not solved. Further, because the prediction is being made based on the travel history of the driver at the branch, the vehicle-position data seems is matched to a road where the vehicle had traveled with higher frequency irrespective of the vehicles actual position, which may cause erroneous matching.

Exemplary implementations of the broad principles described herein provide a vehicle-position-recognition apparatus that can accurately determine and select a link where a vehicle travels from among plural links branched at a branch point, particularly, a narrow-angle-branch point.

Exemplary implementations of the broad principles described herein provide apparatuses, methods, and programs that acquire current position information indicating a current position of a vehicle and acquire road information indicating at least one road based on a connection relationship between plural links. The apparatuses, methods, and programs determine a link where the vehicle travels based on the current position information and the road information and generate travel-history information indicating a route that the vehicle travels at a point where a link is branched based on the determined link. The apparatuses, methods, and programs acquire an image of an area surrounding the vehicle, recognize a recognition target in the acquired image, and store the generated travel-history information in the memory in association with information indicating the recognition of the recognition target. The apparatuses, methods, and programs generate learning-priority information indicating a priority of each link branched out at the branch point based on the stored travel-history information and the stored recognition information, the generated learning-priority information usable to determine on which of the links branched out at the branch point that the vehicle is traveling.

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

Figure 1:
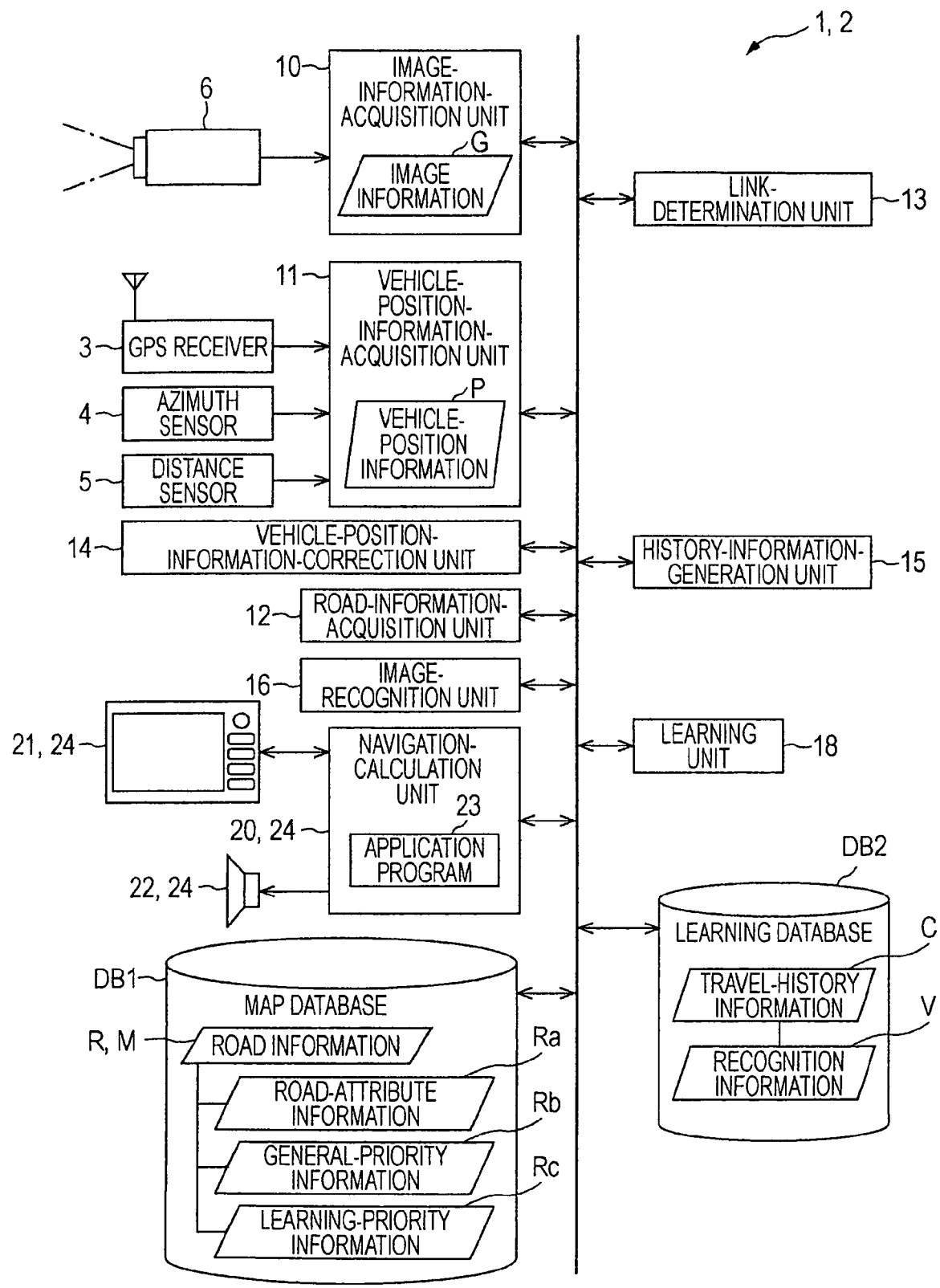
FIG. 1 is a block diagram showing the schematic configuration of an exemplary navigation apparatus.

FIG. 1 is a block diagram showing the schematic configuration of an exemplary navigation apparatus 1. The navigation apparatus 1 includes a vehicle-position-recognition device 2. The vehicle-position-recognition device 2 determines and selects a road where a vehicle travels from among plural roads that are branched at a road-branch point, particularly, a narrow-angle-branch point, and corrects vehicle-position information P. Then, the navigation apparatus 1 performs navigation processing including route guidance or the like based on the corrected vehicle-position information P.

The navigation apparatus 1 shown in FIG. 1 includes an image-information-acquisition unit 10, a vehicle-position-information-acquisition unit 11, a road-information-acquisition unit 12, a link-determination unit 13, a vehicle-position-information-correction unit 14, a history-information-generation unit 15, an image-recognition unit 16, a learning unit 18, a navigation-calculation unit 20, and the like. Each of the above-described function units may be incorporated in the navigation apparatus 1 as at least one of hardware and/or software (program) executed by a controller such as a central-processing unit (CPU), a digital-signal processor (DSP), and/or the like. Each of the above-described units performs various processing procedures for transmitted data. Further, each of the above-described units is configured so that information can be transmitted and/or received between the units.

The navigation apparatus 1 includes a map database DB1 and a learning database DB2. Each of the databases DB1 and DB2 includes a recording medium that can store information and a unit to drive the recording medium, as hardware. The databases may include, for example, a hard-disk drive, a digital versatile disk (DVD) drive including a DVD read-only memory (ROM), a compact-disk (CD) drive including a CD-ROM, and the like. The storage medium may be a rewritable medium and/or a write-once medium, as required. Hereinafter, the configuration of each of the above-described units of the navigation apparatus 1 of the example will be described in detail.

Figure 2:
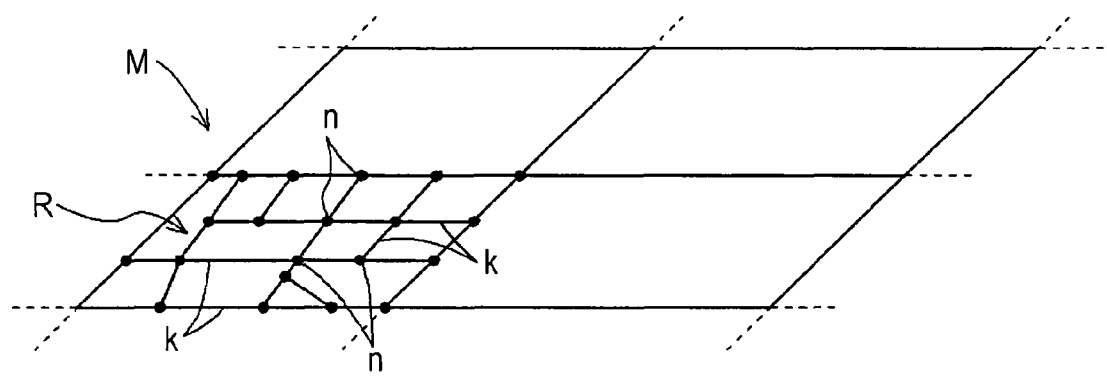
FIG. 2 is an illustration showing an exemplary configuration of map information stored in a map database.

A map database DB1 is a database storing map information M showing an area divided in predetermined sections. FIG. 2 is an illustration showing an exemplary configuration of the map information M stored in the map database DB1. As shown in FIG. 2, the map information M includes road information R showing a road network based on connection relationships between many nodes n corresponding to intersections and links k corresponding to roads connecting the intersection points with one another. Each of the nodes n includes information about a position (coordinates) shown on the map, the position being expressed as a latitude and a longitude. The links k are connected to one another via the nodes n. Further, each of the links k includes information about a shape-interpolation point or the like used to express the road type, the link length, the road width, the link shape, as its attribution information. Here, the road-type information is road-type information showing many types of roads including, for example, a freeway, an urban road, a narrow street, a mountainous road, and the like. The above-described attribute information of the links k corresponds to road-attribute information Ra (refer to FIG. 1). In FIG. 2, only the road information R corresponding to a single section is shown, and other road information R corresponding to other sections is omitted.

Returning to FIG. 1, the road information R includes general-priority information Rb and learning-priority information Rc in addition to the road-attribute information Ra. Each of the general-priority information Rb and the learning-priority information Rc is provided as information showing the priority of each of links k, so as to determine and select a link k where the vehicle travels from among links k extending from the narrow-angle-branch point. The general-priority information Rb, on which details will be described later, is information about a priority determined based on the road-attribute information Ra or the like. The learning-priority information Rc, on which details will be described later, is information about a priority determined based on a result of learning performed based on the history of travel of the vehicle.

Figure 3:
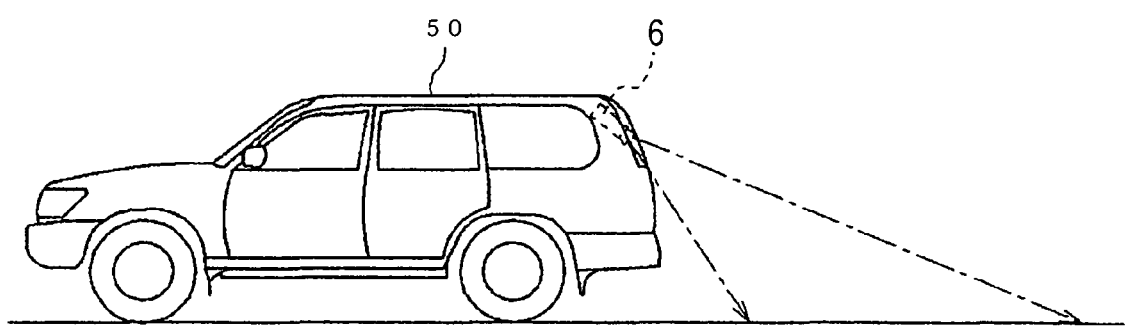
FIG. 3 shows an example where an image-pickup device is provided on a vehicle.

The image-information-acquisition unit 10 functions, so as to acquire image information G showing images picked up by an image-pickup device 6, where the image information G shows images of surroundings of the vehicle. Here, the image-pickup device 6 includes an on-vehicle camera or the like including an image-pickup unit. Further, the image-pickup device 6 is provided, at least, at a position appropriate to pick up an image of the surface of a road around the vehicle. Preferably, the above-described image-pickup device 6 includes a back camera. As shown in FIG. 3, for example, the back camera can be configured to pick up an image of the surface of a road behind the vehicle. The image-information-acquisition unit 10 captures information about the image picked up by the image-pickup device 6 at predetermined time intervals via a frame memory (not shown) or the like. The time intervals at which the image information G is acquired may be, for example, around 10 to 50 ms. Consequently, the image-information-acquisition unit 10 can consecutively acquire the image information G corresponding to at least two frames picked up by the image-pickup device 6. The image information G acquired in the above-described manner is transmitted to the image-recognition unit 16.

The vehicle-position-information-acquisition unit 11 acquires the vehicle-position information P showing the current position of the vehicle. Here, the vehicle-position-information-acquisition unit 11 is connected to a global positioning system (GPS) receiver 3, a direction sensor (e.g., azimuth sensor 4), and a distance sensor 5. Here, the GPS receiver 3 is a device configured to receive a GPS signal transmitted from a GPS satellite. The above-described GPS signal is usually received at intervals of a single second and transmitted to the vehicle-position-information-acquisition unit 11. In the vehicle-position-information-acquisition unit 11, the GPS signal transmitted from the GPS satellite to the GPS receiver 3 is analyzed so that the current position (e.g., the latitude and the longitude), the travel direction, the moving speed, the hour, and the like, of the vehicle can be acquired.

The azimuth sensor 4 is configured to detect the travel direction of the vehicle and/or a change in the travel direction. The azimuth sensor 4 includes, for example, a gyro sensor, a terrestrial-magnetism sensor, an optical rotation sensor and/or a rotation-type resistance volume affixed to a rotation unit of a handle, an angle sensor affixed to a wheel unit, and the like. Then, the azimuth sensor 4 transmits information about the detection result to the vehicle-position-information-acquisition unit 11.

The distance sensor 5 is configured to detect the speed and/or the moving distance of the vehicle. The distance sensor 5 includes, for example, a vehicle-speed pulse sensor configured to output a pulse signal each time a drive shaft, a wheel, and the like, of the vehicle rotates by as much as a predetermined amount, a yaw-rate sensor or a G (Gravity) sensor configured to detect the acceleration of the vehicle, a circuit configured to integrate the detected acceleration, and the like. Then, the distance sensor 5 transmits information about the vehicle speed and the moving distance to the vehicle-position-information-acquisition unit 11, as the detection result. The vehicle-position-information-acquisition unit 11 performs a calculation to determine the vehicle position according to at least one known method based on information transmitted from the GPS receiver 3, the azimuth sensor 4, and/or the distance sensor 5, and acquires the vehicle-position information P.

The road-information-acquisition unit 12 is configured to acquire the road information R showing information about a road based on the connection relationships between the links k. The road-information-acquisition unit 12 acquires the road information R showing the surroundings of the vehicle position, the road information R being extracted from the map database DB1. The acquired road information R includes the road-attribute information Ra, the general-priority information Rb, and the learning-priority information Rc. The road-information-acquisition unit 12 also functions as a road-attribute-information-acquisition unit, a general-priority-information-acquisition unit, and a learning-priority-information-acquisition unit.

The link-determination unit 13 determines the link k where the vehicle travels based on the vehicle-position information P and the road information R. The link-determination unit 13 determines the link k where the vehicle travels by performing the same processing as that performed to achieve known map matching. Further, as will be described later, the link-determination unit 13 determines the link k where the vehicle travels by using the learning-priority information Rc and/or the general-priority information Rb at a point where the link k is branched.

The vehicle-position-information-correction unit 14 corrects the vehicle-position information P according to a road (link k) indicated by the road information R by performing the known map matching based on the result of determination made by the link-determination unit 13. As a result of the correction, the vehicle-position information P acquired by the vehicle-position-information-acquisition unit 11 includes information about the current position of the vehicle, the current position being expressed as the latitude and the longitude, and information about the direction in which the vehicle travels.

The navigation-calculation unit 20 is a calculation unit, for example, operating according to an application program 23, so as to execute navigation functions including displaying the vehicle position, searching a route from a departure point to a destination point, performing course guidance until the vehicle arrives at the destination point, making a search for the destination, and the like. For example, the navigation-calculation unit 20 acquires the map information M showing the area surrounding the vehicle from the map database DB1 based on the vehicle-position information P, displays an image of the map on a display-input unit 21, and superimposes and displays a vehicle-position mark on the map image based on the vehicle-position information P. Further, the navigation-calculation unit 20 makes a search for a route extending from a predetermined departure point to a destination point based on the map information M stored in the map database DB1. The navigation-calculation unit 20 performs the course guidance for a driver by using at least one of the display-input device 21 and a voice-output device 22 based on the searched route extending from the departure point to the destination point and the vehicle-position information P.

According to the above-described example, the navigation-calculation unit 20 is connected to the display-input device 21 and the voice-output device 22. The display-input device 21 includes a display device such as a liquid-crystal-display device and an input device such as a touch panel that are integrated with each other. The voice-output device 22 includes a speaker or the like. According to the above-described example, the navigation-calculation unit 20, the display-input device 21, and the voice-output device 22 function as a guidance-information-output unit 24.

Figure 4:
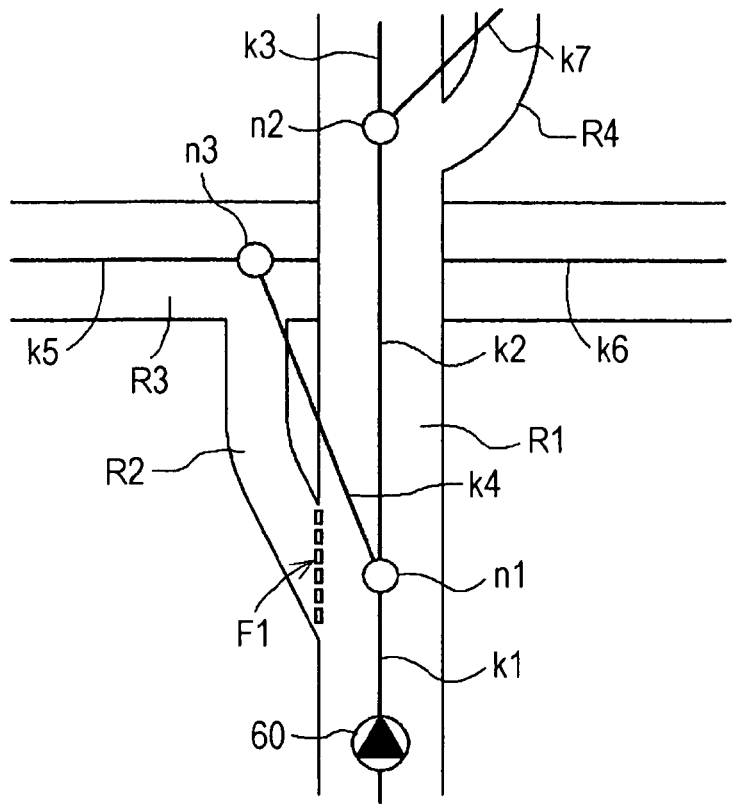
FIG. 4 illustrates a road having a narrow-angle branch.

FIG. 4 illustrates a road including the narrow-angle-branch point and information about the road. In FIG. 4, each of n1, n2, and n3 indicates a node n and each of k1, k2, k3, k4, k5, k6, and k7 indicates a link k. R1, R2, R3, and R4 indicate the roads corresponding to the links k1 to k7. The road R1, which is a main road, has a narrow-angle branch at the node n1. The road R2 branched off from the road R1 extends along the road R1 as a service road and is connected to the road R3, which is a main road orthogonal to the road R1 at the node n3. The vehicle-position mark 60 indicates that the vehicle travels toward the node n1, which is a narrow-angle-branch point. Further, at the point where the road R2 is branched off from the road R1, a road marking F1 shown as a broken line is provided, so as to indicate the above-described branch. The road marking F1 is a feature that is a recognition target according to the present example. Further, at the narrow-angle-branch point, a road is caused to branch at an angle small enough that the azimuth sensor may detect a change in the course with difficulty. The above-described small angle is, for example, an angle of 45°.

Figure 5:
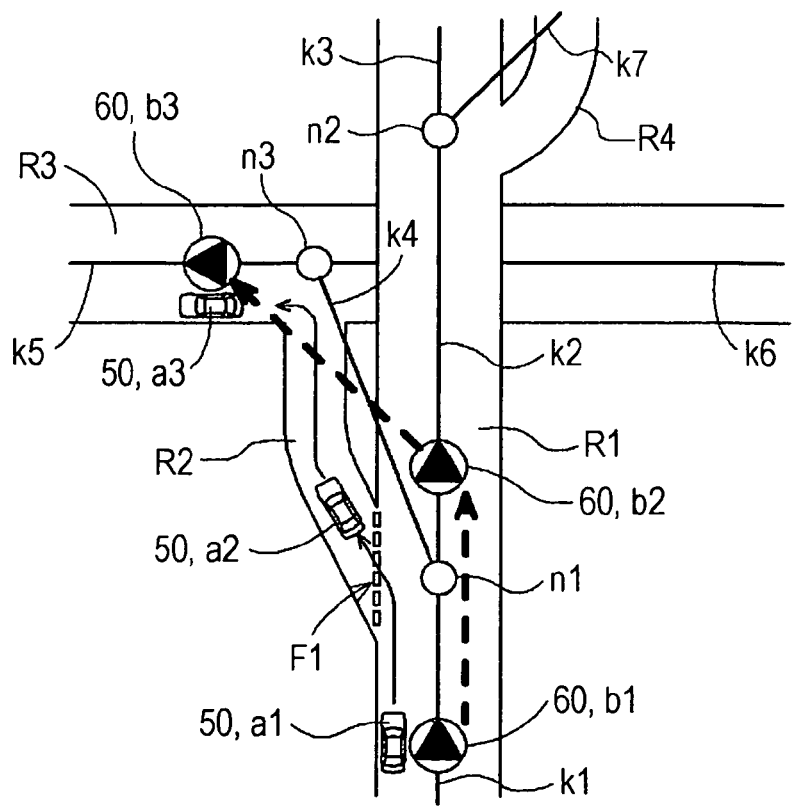
FIG. 5 illustrates an exemplary travel history of the road shown in FIG. 4.

The history-information-generation unit 15 is configured to generate travel-history information C indicating a route where the vehicle travels at a point where the link k is branched out based on the link k determined by the link-determination unit 13. FIG. 5 illustrates the travel history of roads shown in FIG. 4. In FIG. 5, a vehicle 50 traveling the road R1 is headed for the road R3 through the road R2, which is a branch road. At a position a1 shown on the road R1, the vehicle 50 is mapped on the link k1 corresponding to the road R1 through adequate link determination, and the vehicle-position mark 60 is displayed at a position b1 shown on the link k1. The vehicle 50 existing at a position a2 shown on the road R2 extending along the road R1 is not mapped on the link k4 corresponding to the road R2, but on the link k2 corresponding to the road R1. The vehicle-position mark 60 is displayed at a position b2 shown on the link k2. The vehicle 50 existing at a position a3 shown on the road R3 is mapped on the link k5 corresponding to the road R3 based on a fair determination and the vehicle-position mark 60 is shown at a position b3 shown on the link k5.

Each of the above-described positions a1 to a3 of the vehicle 50 and the positions b1 to b3 of the vehicle-position mark 60 shown on the display-input device 21 is a representative point. In actuality, the link determination is made by performing more detailed steps so that the vehicle-position mark 60 is displayed. When a route including the links k determined by the link-determination unit 13 is expressed as a link sequence defined in the determination order, the line sequence is shown as "k1→k2→k5." Referring to FIGS. 4 and 5, the road information R shows no connection relationship between the links k2 and k5. That is to say, the link k2 is directly connected to the link k5 in the line sequence, which means that a "position skip" occurs. The position skip means that the vehicle marks 60 displayed on the display-input device 21 become discontiguous, so that the driver feels a sense of discomfort.

Therefore, the vehicle-position-recognition device 2 generates the travel-history information C based on the travel history of the vehicle and the learning-priority information Rc based on the travel-history information C so that an accurate link determination can be made. The history-information-generation unit 15 generates the travel-history information C based on the route of the links k determined by the link-determination unit 13.

For example, the travel-history information C may indicate the route of the links k shown in the order of link determinations made by the link-determination unit 13 irrespective of the route where the vehicle 50 actually travels. In FIG. 5, for example, the route shown as "C1: k1→k2→k5," that is, a link sequence is generated as the travel-history information C (C1). According to examples shown in FIGS. 4 and 5, link sequences indicating the following routes often become the travel-history information C (C2 to C4).

C2: k1→k4→k5
C3: k1→k2→k3
C4: k1→k4→k3

The link sequence shown as the travel-history information C2 indicates the route from the road R1 to the road R3 via the road R2 based on a fair link determination. The link sequence shown as the travel-history information C3 indicates the route where the vehicle travels the road R1 straight ahead without changing the course at a branch point based on a fair link determination. The link sequence shown as the travel-history information C4 is obtained when the position skip occurs in the different direction from that in which the position skip of the link sequence shown as the travel-history information C1 occurs.

The history-information-generation unit 15 stores data on the route including the links k determined by the link-determination unit 13 from the branch point by as much as at least one predetermined storage section, and generates the travel-history information C based on the stored data on the route including the links k. Here, the at least one predetermined storage section corresponds to, for example, a section extending from the link k shown in the travel-history information C to another link, where the road information R shows no connection relationship between the link k and the another link. That is to say, the predetermined storage section is started from the link k and ended at a point reached with the "position skip." According to the above-described example, the predetermined storage section corresponds to the travel-history information C1 and the travel-history information C4. According to the travel-history information C1, the storage section corresponds to a travel route extending from the link k1 that is determined to be a start point and that is provided before the road is branched to the link k5 reached with the position skip. According to the travel-history information C4, the storage section corresponds to a travel route extending from the link k1 that is determined to be the start point and that is provided before the road is branched to the link k3 reached with the position skip.

In addition, the predetermined storage section may extend from a predetermined point to the next narrow-angle-branch point in a direction in which the vehicle travels, or have predetermined number of links. This is because the travel-history information C should be generated for the narrow-angle-branch point once the next narrow-angle-branch point is attained. Further, a predetermined number of links may be provided for every branch point, so as to determine the link k where the storage section is ended when no position skip occurs. Preferably, the predetermined number is equivalent to or larger than the number of links k, where the "position skip" possibly occurs on the last of the above-described links k. For example, if the storage section has three links and starts from the link k1 that is determined to be the start point and that is provided before the point where the road is branched, a travel route extending from the link k1 to the link k5 and/or a travel route extending from the link k1 to the link k3 corresponds to the storage section. Of course, the storage section may have four or more links, so as to increase precision.

In the above-described example, the travel-history information C is generated in the order of link determination made by the link-determination unit 13 irrespective of the route where the vehicle 50 actually travels. However, the history-information-generation unit 15 may determine a route where the vehicle 50 actually travels at the branch point defined on the link k based on the link k determined by the link-determination unit 13 and generate the travel-history information C indicating the route where the vehicle 50 actually travels.

For example, if the order in which the links k are determined by the link-determination unit 13 is shown as "k1→k2→k5," the vehicle 50 moves from the link k2 to the link k5, where the road information R shows no connection relationship between the link k2 and the link k5. Since the above-described state indicates the position skip, the route where the vehicle 50 actually travels is determined to be "k1→k4→k5" and information about the above-described route is generated as the travel-history information C.

The image-recognition unit 16 is configured to recognize an image of a recognition target. The image is included in the image information G. Here, the recognition target is a feature included in image information G and includes at least one of an edge, a predetermined color, and a predetermined shape. The result of recognition of the recognition target is a characteristic amount obtained through predetermined image-recognition processing performed for the recognition target. Preferably, the recognition target is a feature existing on the road surface, that is, a road marking provided on the road surface. Information about the road marking can be extracted as an edge component by subjecting the image information G to known Gaussian filtering or the like. If the edge component is determined to be the recognition target, the varying number of the extracted edge components becomes a characteristic amount, as the recognition result.

Further, the color component of the road marking painted white, yellow, or orange can be extracted by subjecting the image information G to known window-comparator processing. If each of the above-described colors is determined to be the recognition target, the color type and the varying number of extracted color components corresponding thereto become the characteristic amount obtained as the recognition result. Further, a predetermined shape including a triangle, a circle, a square, a figure, and the like may be determined to be the recognition target and subjected to pattern-matching processing. Then, the matching degree obtained as a result of the pattern matching may be determined to be the characteristic amount.

According to FIGS. 4 and 5, a road marking F1 is recognized, as the recognition target. The simplest example of the recognition result is information about whether an image of the road marking F1 is recognized. For example, when the vehicle 50 traveling along the road R1 changes its course from the road R1 to the road R2, the vehicle 50 travels over the road marking F1. As a result, the image-recognition unit 16 recognizes the image of the road marking F1, which is the recognition target. On the other hand, if the vehicle 50 keeps traveling along the road R1, the vehicle 50 does not travel over the road marking F1 and the road marking F1 is not recognized as the recognition target. The result of recognition of the road marking F1, which is the recognition target, becomes recognition information V. According to the above-described example, the following two types of recognition information V1 and recognition information V2 are obtained according to whether the image of the road marking F1 is recognized.

V1: Road marking F1 is recognized

V2: Road marking F1 is not recognized

The learning database DB2 functions as a history-information-storage unit configured to store the travel history information C generated by the history-information-generation unit 15 in association with recognition information indicating the result of recognition of the recognition target, the recognition being performed by the image-recognition unit. The learning database DB2 compiles information about a travel ratio of a travel route in association with recognition information V into a database for each branch point, where the travel route extends from the branch point, so that the travel-ratio information and the recognition information V are stored. For example, the travel-history information items C1, C2, C3, and C4 have information about the following travel ratios according to the recognition results indicated by the recognition information V.

V1: Road Marking F1 is Recognized

C1: k1→k2→k5: 78%

C2: k1→k4→k5: 22%

C3: k1→k2→k3: 0%

C4: k1→k4→k3: 0%

V2: Road Marking F1 is Not Recognized

C1: k1→k2→k5: 7%

C2: k1→k4→k5: 2%

C3: k1→k2→k3: 90%

C4: k1→k4→k3: 1%

Here, when the travel-history information C (C12 and C13) is generated based on the travel route where the vehicle actually travels, the travel-history information C has the following travel ratios based on the recognition result indicated by the recognition information V.

V1: Road Marking F1 is Recognized

C12: k1→k4→k5: 100%

C13: k1→k2→k3: 0%

V2: Road Marking F1 is Not Recognized

C12: k1→k4→k5: 9%

C13: k1→k2→k3: 91%

The image information G, which is acquired by the image-information-acquisition unit 10, showing images of surroundings of the vehicle 50 includes a picked-up image of the road R2 where the vehicle 50 actually travels. Therefore, the result of recognition of the road marking F1 matches the road R2 where the vehicle 50 travels. Therefore, when the road marking F1 is recognized, the vehicle 50 travels along the road R2 corresponding to the link k4 at a travel ratio of 100%. On the other hand, when the road marking F1 is not recognized, the vehicle 50 travels along the road R1 corresponding to the link k2 at a travel ratio of the order of 100%. However, since the quality of the image information G is affected by imaging conditions including the weather, the hour, and the like, the image of the road marking F1 may not be recognized even though the vehicle 50 travels along the road R2. As a result, in this example, the vehicle 50 travels along the road R2 corresponding to the link k4 at a travel ratio of 9% even though the image of the road marking F1 is not recognized.

The learning unit 18 generates the learning-priority information Rc indicating the priority of each of the links k based on the travel-history information C stored in the history-information-storage unit 15, the priorities being used when the link k where the vehicle 50 travels is determined and selected from among the links k branched out at a branch point. According to the travel-history information items C1 to C4 and the recognition information items V1 and V2 that are stored in the learning database DB2, the travel ratio at which the vehicle 50 travels to the links k, that is, the link k2 and the link k4 that branch out at the branch point are as follows based on the recognition result indicated by the recognition result V.

V1: Road Marking F1 is Recognized k1→k2: 0% k1→k4: 100%

V2: Road Marking F1 is Not Recognized k1→k2: 91% k1→k4: 9%

Therefore, the learning unit 18 generates the learning-priority information Rc indicating priorities given to the link k2 and the link k4 based on the travel ratio and the image-recognition information. The learning unit 18 extracts the travel-history information C from the learning database DB2 based on the result of recognition of the recognition target, the recognition performed by the image-recognition unit 16. At that time, the travel-history information C is associated with the recognition information V matching the above-described recognition result. Then, the learning unit 18 generates the learning-priority information Rc based on the extracted travel-history information C. According to the above-described example, the learning-priority information Rc is generated as the following coefficients.

V1: Road Marking F1 is Recognized k1→k2: 0.0
k1→k4: 10.0

V2: Road Marking F1 is Not Recognized k1→k2: 9.1
k1→k4: 0.9

Thus, the learning unit 18 generates the learning-priority information Rc based on the travel ratio of the vehicle and whether the recognition target exists at the branch point. The learning-priority information Rc indicates a priority determined based on the travel ratio of the vehicle, the travel ratio being determined based on the travel-history information C associated with the recognition information V matching the result of recognition of the recognition target by the image-recognition unit 16.

Further, the above-described travel ratio is a ratio at which the vehicle travels to each of the links k branched at the branch point when the above-described recognition result is obtained. The learning-priority information Rc generated by the learning unit 18 in the above-described manner is used by the link-determination unit 13 in determining the link k where the vehicle travels. Further, the result of the determination of the link k where the vehicle travels is used by the vehicle-position-information-correction unit 14, so as to correct the vehicle-position information P.

Hereinafter, an exemplary vehicle-position-recognition method will be described with reference to FIG. 6. The exemplary method may be implemented, for example, by one or more components of the above-described navigation apparatus and/or vehicle-position-recognition device 2. For example, the method may be implemented as a program executed by one or more units of the apparatus 1 and/or device 2, which, as discussed above, may be implemented by the controller (including the CPU, the DSP, and/or the like). However, even though the exemplary structure of the above-described apparatus 1 and/or device 2 may be referenced in the description, it should be appreciated that the structure is exemplary and the exemplary method need not be limited by any of the above-described exemplary structure.

The following description will be provided based on the premise that the vehicle-position-recognition device 2 recognizes, in advance, that the vehicle passes through the link k1 shown in each of FIGS. 4 and 5.

Figure 6:
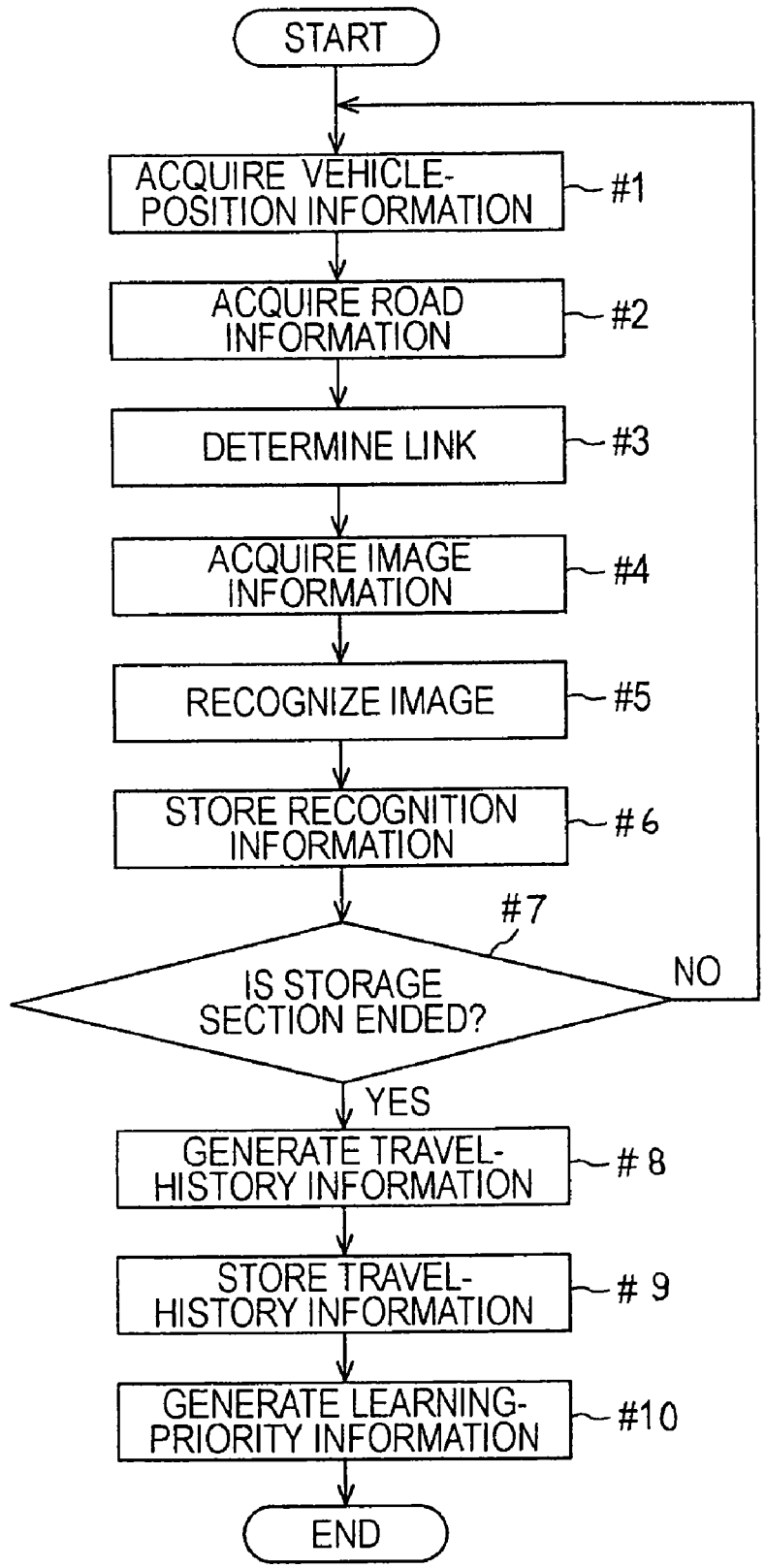
FIG. 6 is a flowchart illustrating an exemplary vehicle-position-recognition method.
Figure 7:
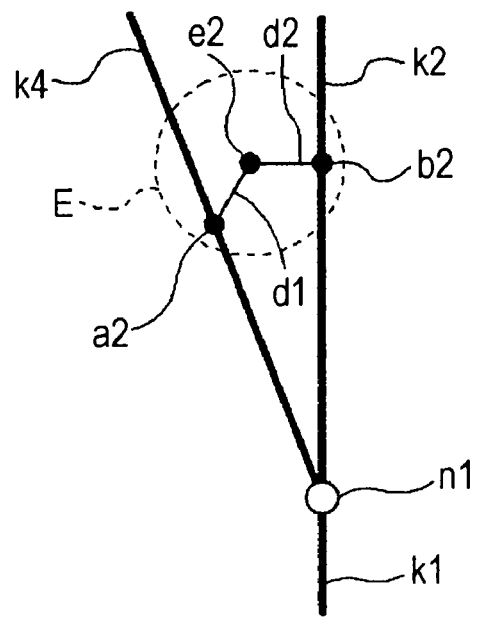
FIG. 7 illustrates an exemplary link determination made at a narrow-angle branch.

As shown in FIG. 6, the vehicle-position-information-acquisition unit 11 first acquires vehicle-position information P (Step #1). Then, the road-information-acquisition unit 12 acquires road information R (Step #2). The link-determination unit 13 determines the link k where the vehicle 50 travels based on the acquired vehicle-position information P and the acquired road information R (Step #3). Hereinafter, the method of determining the link k will be described with reference to specific examples. FIG. 7 illustrates link determination performed at the narrow-angle-branch point shown in each of FIGS. 4 and 5.

According to an example shown in FIG. 7, the vehicle-position information P, which is not yet corrected by the vehicle-position-information-correction unit 14, is acquired as information indicating a position e2. Further, the vehicle-position information P includes information about an error area E. If the position indicated by the vehicle-position information P corresponds to the position e2, both the link k2 defined on the main line and the link k4 branched off the node n1, which is the narrow-angle-branch point, fall within the error area E. Therefore, the link-determination unit 13 determines the link k where the vehicle 50 travels based on a coefficient D expressing each of a distance d2 from the position e2 indicated by the vehicle-position information P to the link k2 and a distance d1 from the position e2 to the link k4 and the general-priority information Rb. Here, the link-determination unit 13 calculates the value of the coefficient D denoting the distance d1 from the position e2 to the link k4 as 5.0, for example. On the other hand, the coefficient D denoting the distance d2 from the position e2 to the link k2 is calculated as 5.0, for example.

The road information R acquired by the road-information-acquisition unit 12 includes the general-priority information Rb indicating the priority of the link k provided at the above-described branch point. The general-priority information Rb is determined based on the road attribute and indicates the priority of each of the links k, where the priority information is used to determine and select the link k where the vehicle 50 travels from among plural links branched out. The general-priority information Rb is, for example, information about the priority of each of the links k branched out at the branch point. Each of the priorities is determined based on the degree of vehicle-travel possibility of each of the links k based on general conditions including the road type, the road width, and the like, included in the attribute information of each of the links k. If the road R1 indicated by the link k2 is the main line and the road R3 indicated by the link k4 is the service road, as shown in FIGS. 4 and 5, the general-priority information Rb indicates that the value of the link k2 is 8.0 and the value of the link k4 is 2.0. The link-determination unit 13 calculates the matching degree as below by using the coefficient D of the distance to the link k and the general-priority information Rb.

$$k2: D \times Rb = 5.0 \times 8.0 = 40.0$$

$$k4: D \times Rb = 5.0 \times 2.0 = 10.0$$

Thus, the matching degree attained by the link k4 where the vehicle 50 actually travels becomes lower than that attained by the link k2 extending along the link k4. Consequently, the link-determination unit 13 determines the link k2 to be the link k where the vehicle 50 travels.

Next, the image-information-acquisition unit 10 acquires the image information G of surroundings of the vehicle including images picked up by the image-pickup device 6 (Step #4). Then, the image-recognition unit 16 recognizes an image of the recognition target included in the acquired image information G (Step #5). According to examples shown in FIGS. 4 and 5, an image of the road marking F1 is recognized and the recognition result is temporarily stored as the recognition information V (Step #6).

Prior to step #6, it may optionally be determined whether an image of some recognition target is recognized and if it is determined that the image recognition is performed, the recognition information V including data on the recognized image is stored temporarily. Further it should be noted that Steps #1 to #3 and Steps #4 to #6 may be performed in parallel with each other.

Next, the history-information-generation unit 15 determines whether a predetermined storage section used to generate the travel-history information C is ended (Step #7). As described above, the predetermined storage section is, for example, a section extending from the link k shown in the travel-history information C to another link, where the road information R shows no connection relationship between the link k and the another link, which means the occurrence of the "position skip," and/or a section extending from the link k to the next narrow-angle-branch point along a direction in which the vehicle travels. A link sequence indicated by the travel-history information C that can be currently generated is shown as link k1→link k2. The above-described link sequence does not satisfy conditions for finishing the above-described storage section. Therefore, at Step #7, the result of determination made by the history-information-generation unit 15 is "NO." Thus, the method returns to Step #1, and Steps #1 to #6 are performed repeatedly until the predetermined storage section is ended (Step #7=YES).

When the vehicle reaches the position a3 shown in FIG. 5, the link k included in the error area E is the link k5 only. Therefore, if the link determination is performed in the above-described manner, the link k where the vehicle 50 travels is determined to be link k5. In that case, the road information R shows that there is no connection relationship between the links k2 and k5, which indicates that the "position skip" occurred between the links k2 and k5. Due to the occurrence of the position skip, the history-information-generation unit 15 determines that the storage section is ended (Step #7=YES).

Then, the history-information-generation unit 15 generates a link sequence expressed as "k1→k2→k5" as the travel-history information C (Step #8). The travel-history information C may include information about a link sequence indicating the order in which the links k determined in the above-described manner appear, or a link sequence indicating an actual route. In the above-described example, the travel-history information C may include information about a link sequence indicating the order in which the links k determined by the link-determination unit 13 appear irrespective of an actual travel route.

The generated travel-history information C is associated with the recognition information V indicating the result of recognition of the recognition target, the recognition being performed during the image-recognition procedure, and stored in the learning database DB2 (Step #9). The travel-history information C is stored by performing the above described processing each time the vehicle passes the same branch point. When the vehicle passes the same branch point a plurality of times, the following information indicating the travel ratio of the vehicle 50 is associated with the recognition information V and stored in the learning database DB2.

V1: Road Marking F1 is Recognized

C1: k1→k2→k5: 78%
C2: k1→k4→k5: 22%
C3: k1→k2→k3: 0%
C4: k1→k4→k3: 0%

V2: Road Marking F1 is Not Recognized

C1: k1→k2→k5: 7%
C2: k1→k4→k5: 2%
C3: k1→k2→k3: 90%
C4: k1→k4→k3: 1%

The learning unit 18 generates the learning-priority information Rc indicating the priorities of the links k based on the travel-history information items C1 to C4 and the recognition information items V1 and V2, where the priorities are used by the link-determination unit 13, so as to determine and select the link k where the vehicle 50 travels from among the links k branched out at the branch point (Step #10). According to the travel-history information items C1 to C4 stored in the learning database DB2, the ratio at which the vehicle travels to the plural links k, that is, the link k2 and the link k4 that are branched out at the branch point is as follows according to the recognition information V.

V1: Road marking F1 is Recognized k1→k2: 0%
k1→k4: 100%

V2: Road Marking F1 is Not Recognized k1→k2: 91%
k1→k4: 9%

The learning unit 18 generates the learning-priority information Rc showing the priority given to each of the links k2 and k4 based on the above-described travel ratio and whether the image of the road marking F1 is recognized, the road marking F1 being provided as the recognition target. According to the above-described example, the learning-priority information Rc is generated as below, as coefficients.

V1: Road Marking F1 is Recognized k1→k2: 0.0
k1→k4: 10.0

V2: Road Marking F1 is Not Recognized k1→k2: 9.1
k1→k4: 0.9

After the learning procedure is performed, that is, the learning-priority information Rc is generated, the link determination (Step #3) is performed as below each time the vehicle 50 passes the same branch point. Referring to FIG. 7, an example where the learning-priority information Rc is used for achieving the link determination will be described. The coefficient D of the distance to the link k and the general-priority information Rb are the same as those of the above-described example. Namely, the coefficient D of the distance is expressed by the expression d1=d2=5.0. Further, according to the general-priority information Rb, k1→k2 is 8.0, and k1→k4 is 2.0. The link-determination unit 13 then calculates the matching degree as below by using the coefficient D of the distance to the link k, the general-priority information Rb, and the learning-priority information Rc.

V1: Road Marking F1 is Recognized $k2: D \times Rb \times Rc = 5.0 \times 8.0 \times 0.0 = 0.0$ $k4: D \times Rb \times Rc = 5.0 \times 2.0 \times 10.0 = 100.0$ V2: Road Marking F1 is Not Recognized $k2: D \times Rb \times Rc = 5.0 \times 8.0 \times 9.1 = 364.0$ $k4: D \times Rb \times Rc = 5.0 \times 2.0 \times 0.9 = 9.0$ Thus, when the recognition information V indicates that the image of the road marking F1 is recognized, the matching degree attained at the link k4 where the vehicle actually travels becomes higher than that attained at the link k2 extending along the link k4. Consequently, the link-determination unit 13 determines the link k4 to be the link k where the vehicle travels. Namely, an adequate link k is determined to be the link k where the vehicle 50 travels based on the result of recognition of the image of the road marking F1 that is the recognition target.

On the other hand, when the recognition information V indicates that the image of the road marking F1 is not recognized, the matching degree attained at the link k2 becomes higher than that attained at the link k4. When the vehicle 50 travels along the road R2 corresponding to the link k2, the image of the road marking F1 is not recognized so that an adequate link k is determined. However, even though the image of the road marking F1 is not recognized, the vehicle 50 often travels along the link k4 so that erroneous matching occurs. However, as described above, the image of the road marking F1 is not recognized and the travel ratio at which the vehicle 50 travels along the link k4 is about 9%. The possibility of the erroneous matching depends on a probability that the image-recognition unit 16 does not recognize the road marking F1 even though the vehicle 50 travels over the road marking F1 and a frequency with which the vehicle 50 travels along the link k. Therefore, the above-described erroneous matching is substantially reduced so that any problem occurring due to the erroneous matching is also substantially reduced. Namely, the erroneous matching is significantly reduced compared with conventional methods.

In the above-described example, the learning-priority information Rc is used in addition to the general-priority information Rb. However, the matching degree may be determined by using the learning-priority information Rc instead of the general-priority information Rb. In that case, the matching degree is calculated as below.

V1: Road Marking F1 is Recognized $k2: D \times Rb \times Rc = 5.0 \times 0.0 = 0.0$ $k4: D \times Rb \times Rc = 5.0 \times 10.0 = 50.0$ V2: Road Marking F1 is Not Recognized $k2: D \times Rb \times Rc = 5.0 \times 9.1 = 45.5$ $k4: D \times Rb \times Rc = 5.0 \times 0.9 = 4.5$ In the above-described example (hereinafter referred to as the first example), the travel-history-information items C1 to C4 shown in FIGS. 4 and 5 are stored in the database DB2 based on the recognition result indicated by the recognition information V. However, the travel-history-information items C1 to C4 may be stored in the database DB2 so that whether the road marking F1 is recognized is indicated for each of link sequences indicating the travel history as below.

C1: k1→k2→k5: V1: road marking F1 is recognized: 90%
 V2: road marking F1 is not recognized: 10%
C2: k1→k4→k5: V1: road marking F1 is recognized: 90%
 V2: road marking F1 is not recognized: 10%
C3: k1→k2→k3: V1: road marking F1 is recognized: 0%
 V2: road marking F1 is not recognized: 100%
C4: k1→k4→k3: V1: road marking F1 is recognized: 0%
 V2: road marking F1 is not recognized: 100%

According to the travel-history information items C1 to C4 and the recognition information items V1 and V2 that are stored in the learning database DB2, the ratio at which the vehicle 50 travels to the plural links k, that is, the link k2 and the link k4 that are branched out at the branch point becomes if as follows according to the recognition result indicated by the recognition information V.

k1→k2: V1: road marking F1 is recognized: 90%
 V2: road marking F1 is not recognized: 10%
k1→k4: V1: road marking F1 is recognized: 0%
 V2: road marking F1 is not recognized: 100%

That is to say, the road marking F1 is not necessarily recognized each time the vehicle 50 travels to the link k2. Further, the road marking F1 is necessarily not recognized each time the vehicle 50 travels to the link k4. That is to say, the vehicle 50 travels along the link k4 at a ratio of 10% even though the road marking F1 is not recognized. Therefore, the learning-priority information Rc is generated based on the recognition information V, as is the case with the first example. Depending solely on the above-described description, the vehicle travels to the link k2 and the link k4 at the following ratios.

V1: Road Marking F1 is Recognized k1→k2: 0.0
k1→k4: 9.0

V2: Road Marking F1 is Not Recognized k1→k2: 10.0
k1→k4: 1.0

If the ratios at which the vehicle 50 travels to the links k2 and k4 are calculated, as is the above-described first example, the vehicle 50 travels to the links k2 and k4 as below.

V1: Road Marking F1 is Recognized k1→k2: 0.0
k1→k4: 10.0

V2: Road Marking F1 is Not Recognized k1→k2: 9.1
k1→k4: 0.9

Thus, the same learning-priority information Rc as that obtained in the above-described first example can be obtained.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

Figure 8:
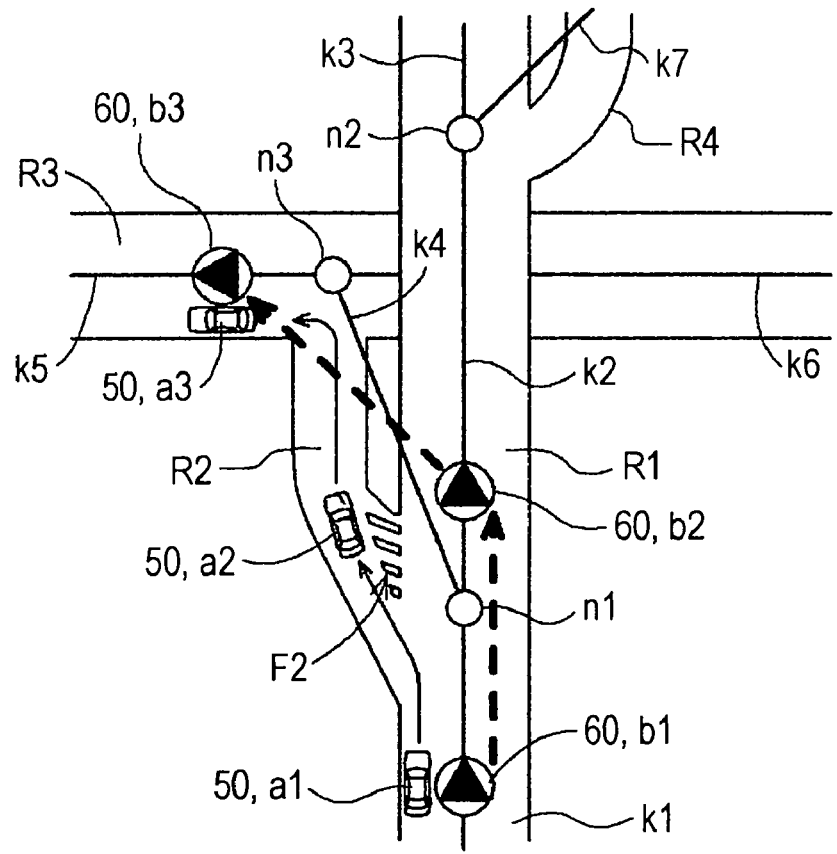
FIG. 8 illustrates an exemplary travel history of a road having a narrow-angle branch.

For example, according to the above-described examples, the learning-priority information Rc is generated based on whether the image of the recognition target is recognized at the branch point (indicated by the recognition information V) and the ratio at which the vehicle travels obtained at the branch point. However, the learning-priority information Rc may be generated at the branch point indicated by the recognition information based on the position where the recognition target is recognized and the ratio at which the vehicle passes the branch point. For example, when a road marking F2 which is the recognition target is provided across the boundary of two branching roads, as shown in FIG. 8, and when the vehicle 50 travels along the road R1, the image of the road marking F2 is recognized in an area defined in the left region of the image of the image information G. Further, when the vehicle 50 travels along the road R2, the image of the road marking F2 is recognized in an area defined in the right region of the image of the image information G. That is to say, the learning-priority information Rc can be generated based on the position the same recognition target is recognized in the image information G.

Figure 9:
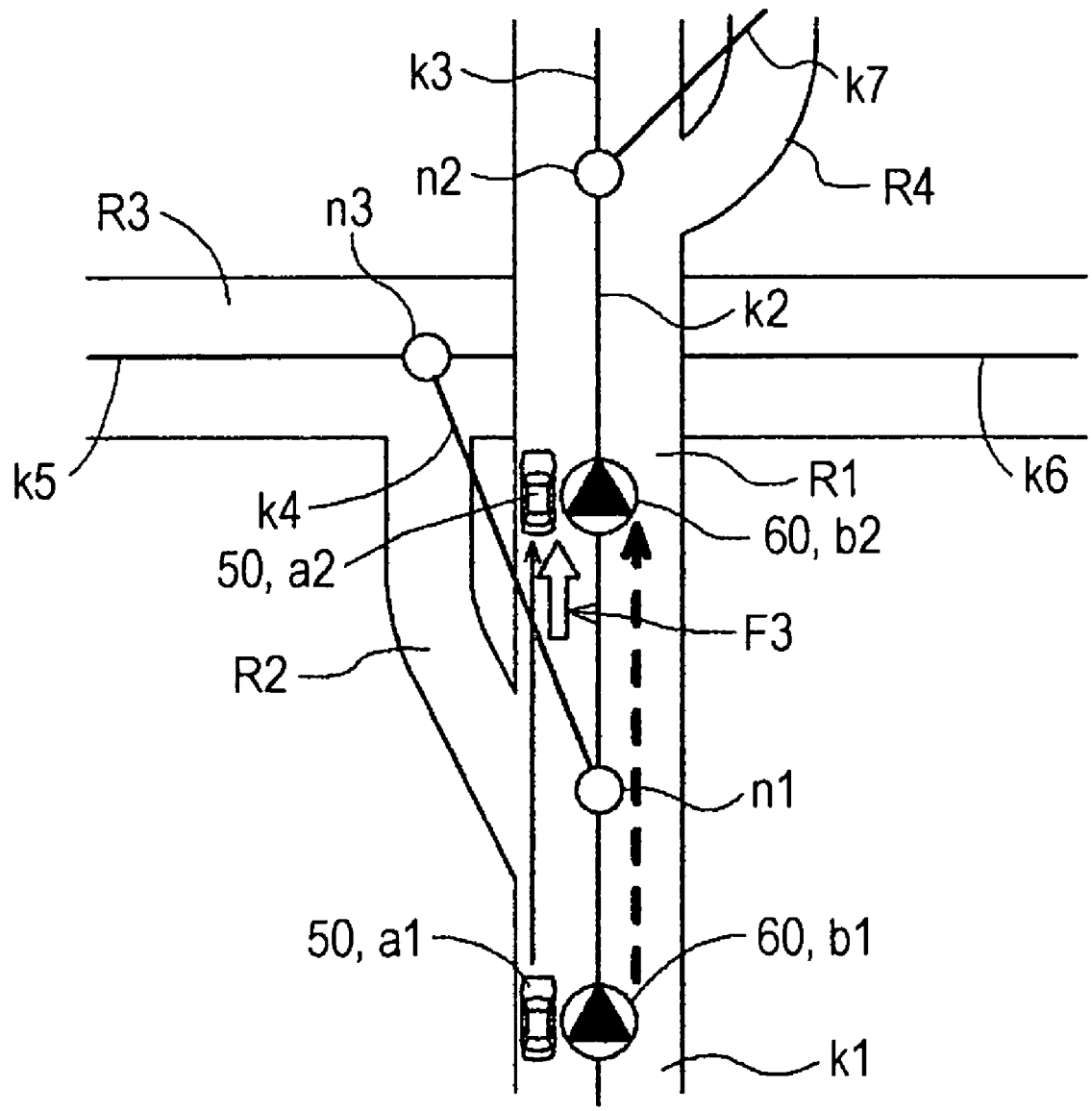
FIG. 9 illustrates an exemplary travel history of a road having a narrow-angle branch.

Furthermore, the learning-priority information Rc may be generated by determining a road marking F3 to be the recognition target, where the road marking F3 exists on the road R1 to which the position of the vehicle 50 is hardly matched by mistake, as shown in FIG. 9.

Additionally, the general-priority information Rb may be generated by the general-priority-information-acquisition unit each time the link-determination unit 13 determines the link k where the vehicle 50 travels. That is, another function unit may be provided, so as to generate the general-priority information based on the road-attribute information Ra or the like. Further, the learning-priority information Rc may not be generated by the learning unit 18 and stored in the map database DB1 in advance. Namely, the learning-priority information Rc may be generated by the learning unit 18 each time the link-determination unit 13 determines the link k where the vehicle 50 travels based on the travel-history information C stored in the learning database DB2.

Furthermore, the priority of each of the links k may be determined by using other conditions in addition to the above-described information items Rc and Rb. For example, if a route to the destination point is determined by the navigation-calculation unit 20, links where the vehicle travels may be determined by using determined-route-priority information used to increase priorities of the links k provided along the determined route.

Moreover, the feature existing on the road surface may include a stain on the road surface, soil on the road surface, cracks in the road surface, seams of a pavement, the lid of a manhole, and the like that can be determined to be the recognition target. The border between the stains, the soil, the cracks, and the like in the road surface and the road surface can be extracted as an edge component by subjecting the image information G to known Gaussian filtering or the like. If the edge component is determined to be the recognition target, the varying number of extracted edge components can be determined to be a characteristic amount as the recognition result. Of course, the shape of the feature may be recognized based on detected edge components and determined to be the characteristic amount. Further, the recognition target may be a road sign and/or an information sign.

What is claimed is:

1. A vehicle-position-recognition apparatus, comprising:
a memory; and
a controller that:
acquires current position information indicating a current position of a vehicle;
acquires road information indicating at least one road based on a connection relationship between plural links;
determines a link where the vehicle travels based on the current position information and the road information;
generates travel-history information indicating a route that the vehicle travels at a point where a link is branched based on the determined link;
acquires an image of an area surrounding the vehicle;
recognizes a recognition target in the acquired image;
stores the generated travel-history information in the memory in association with information indicating the recognition of the recognition target; and
generates learning-priority information indicating a priority of each link branched out at the branch point based on the stored travel-history information and the stored recognition information, the generated learning-priority information being used to determine on which of the links branched out at the branch point that the vehicle is traveling.

2. The vehicle-position-recognition apparatus according to claim 1, wherein the controller stores information about a route from the branch point over at least one predetermined storage section and generates the travel-history information based on the stored route information.

3. The vehicle-position-recognition apparatus according to claim 2, wherein the predetermined storage section is a section extending from a first link indicated by the travel-history information to a second link reached with a position skip so that the road information shows no connection relationship between the first and second links.

4. The vehicle-position-recognition apparatus according to claim 2, wherein the predetermined storage section extends from the branch point to a next branch point in a direction in which the vehicle travels.

5. The vehicle-position-recognition apparatus according to claim 1, wherein the controller:
extracts a piece of travel-history information from the memory that is associated with the recognition information agreeing with the recognition result; and
generates the learning-priority information based on the extracted piece of travel-history information.

6. The vehicle-position-recognition apparatus according to claim 1, wherein the learning-priority information shows a priority determined based on:
whether the recognition target is recognized at the branch point; and
a travel ratio at which the vehicle travels on each of the links branched out at the branch point, the travel ratio being determined based on the travel-history information.

7. The vehicle-position-recognition apparatus according to claim 1, wherein the learning-priority information shows a priority determined based on:
a position where the recognition target is recognized; and
a travel ratio at which the vehicle travels on each of the links branched out at the branch point, the travel ratio being determined based on the travel-history information.

8. The vehicle-position-recognition apparatus according to claim 1, wherein the controller determines the link on which the vehicle travels by using the learning-priority information.

9. The vehicle-position-recognition apparatus according to claim 1, wherein the controller:
acquires general-priority information that is set based on an attribute of a road and that indicates a priority of each link branched out at the branch point; and
determines the link where the vehicle travels from among the links branched out at the branch point based on the general-priority information.

10. The vehicle-position-recognition apparatus according to claim 1, wherein the controller corrects the current position information based on a result of the determination of the link where the vehicle travels.

11. The vehicle-position-recognition apparatus according to claim 1, wherein the point where the link is branched is a branch having an angle of 45° or less.

12. The vehicle-position-recognition apparatus according to claim 1, wherein the controller:
determines a route where the vehicle actually travels at the point where the link is branched based on the determined link; and
generates the travel-history information indicating the route where the vehicle actually travels.

13. The vehicle-position-recognition apparatus according to claim 1, wherein the controller generates the travel-history information based on an order of at least two determined links.

14. A navigation apparatus comprising the vehicle-position-recognition apparatus according to claim 1, wherein:
the memory stores the road information;
the controller outputs guide information based on the determined one of the links branched out at the branch point on which the vehicle is traveling.

15. A controller-implemented vehicle-position-recognition method, comprising:
acquiring, with the controller, current position information indicating a current position of a vehicle;
acquiring, with the controller, road information indicating at least one road based on a connection relationship between plural links;
determining, with the controller, a link where the vehicle travels based on the current position information and the road information;
generating, with the controller, travel-history information indicating a route that the vehicle travels at a point where a link is branched based on the determined link;
acquiring, with the controller, an image of an area surrounding the vehicle;
recognizing, with the controller, a recognition target in the acquired image;
storing, with the controller, the generated travel-history information in a memory in association with information indicating the recognition of the recognition target; and
generating, with the controller, learning-priority information indicating a priority of each link branched out at the branch point based on the stored travel-history information and the stored recognition information, the generated learning-priority information being used to determine on which of the links branched out at the branch point that the vehicle is traveling.

16. The controller-implemented vehicle-position-recognition method according to claim 15, further comprising:
determining, with the controller, the link branched out at the branch point on which the vehicle is traveling based on the generated learning-priority information.

17. The controller-implemented vehicle-position-recognition method according to claim 15, wherein the learning-priority information shows a priority determined based on:
a position where the recognition target is recognized; and
a travel ratio at which the vehicle travels on each of the links branched out at the branch point, the travel ratio being determined based on the travel-history information.

18. The controller-implemented vehicle-position-recognition method according to claim 15, further comprising:
acquiring, with the controller, general-priority information that is set based on an attribute of a road and that indicates a priority of each link branched out at the branch point; and
determining, with the controller, the link where the vehicle travels from among the links branched out at the branch point based on the general-priority information.

19. The controller-implemented vehicle-position-recognition method according to claim 15, further comprising:
generating, with the controller, the travel-history information based on an order of at least two determined links.

20. A computer-readable storage medium storing a computer-executable vehicle-position-recognition program, the program comprising:
instructions for acquiring current position information indicating a current position of a vehicle;
instructions for acquiring road information indicating at least one road based on a connection relationship between plural links;
instructions for determining a link where the vehicle travels based on the current position information and the road information;
instructions for generating travel-history information indicating a route that the vehicle travels at a point where a link is branched based on the determined link;
instructions for acquiring an image of an area surrounding the vehicle;
instructions for recognizing a recognition target in the acquired image;
instructions for storing the generated travel-history information in a memory in association with information indicating the recognition of the recognition target; and
instructions for generating learning-priority information indicating a priority of each link branched out at the branch point based on the stored travel-history information and the stored recognition information, the generated learning-priority information being used to determine on which of the links branched out at the branch point that the vehicle is traveling.

* * * * *